United States Patent

Grandin et al.

[11] Patent Number: 5,833,735
[45] Date of Patent: Nov. 10, 1998

[54] METHOD OF MAKING STEEL

[75] Inventors: Friedrich-Hans Grandin, Ratingen; Walter Pfaff, Braunfels, both of Germany

[73] Assignee: Maschinenfabrik Koppern GmbH & Co. KG, Hattingen, Germany

[21] Appl. No.: 583,128

[22] PCT Filed: Jul. 20, 1994

[86] PCT No.: PCT/EP94/02393

§ 371 Date: Mar. 18, 1996

§ 102(e) Date: Mar. 18, 1996

[87] PCT Pub. No.: WO95/03433

PCT Pub. Date: Feb. 2, 1995

[30] Foreign Application Priority Data

Jul. 20, 1993 [DE] Germany .......................... 43 24 343.6

[51] Int. Cl.[6] .................................................. C21B 13/14
[52] U.S. Cl. ................................ 75/544; 75/320; 75/961; 75/962
[58] Field of Search .......................... 75/504, 544, 320, 75/569, 961, 962

[56] References Cited

U.S. PATENT DOCUMENTS 2,865,731  12/1958  Crowe .
3,653,876   4/1972  Wienert ........................................ 75/320
4,765,829   8/1988  Beckmann et al. ........................ 75/504
5,100,464   3/1992  Kelly et al. .
5,591,247   1/1997  Dumont et al. ............................ 75/329

FOREIGN PATENT DOCUMENTS 602777      8/1960  Canada ........................................ 75/504
0499779A1   8/1992  European Pat. Off. .
1138229    10/1962  Germany .
3307175     9/1983  Germany .
1-116018    5/1989  Japan ......................................... 75/569

*Primary Examiner*—Melvyn Andrews
*Attorney, Agent, or Firm*—Burns, Doane, Swecker & Mathis, L.L.P.

[57] ABSTRACT

A method of producing briquettes for use in steelmaking processes in a melting vessel. Prior to the briquetting step, the residues should have added thereto essentially uniformly distributed carbon carriers, the amount of carbon carriers added corresponding precisely to the amount required for causing an essentially complete reduction of the iron-oxide containing residues. The residues obtained as byproducts in a smelting plant can thus be reused to a high degree by adding them to a steelmaking process. A residue briquette can be supplied to the melting vessel in an amount of up to 30%. This permits the use of residues instead of scrap.

11 Claims, 1 Drawing Sheet

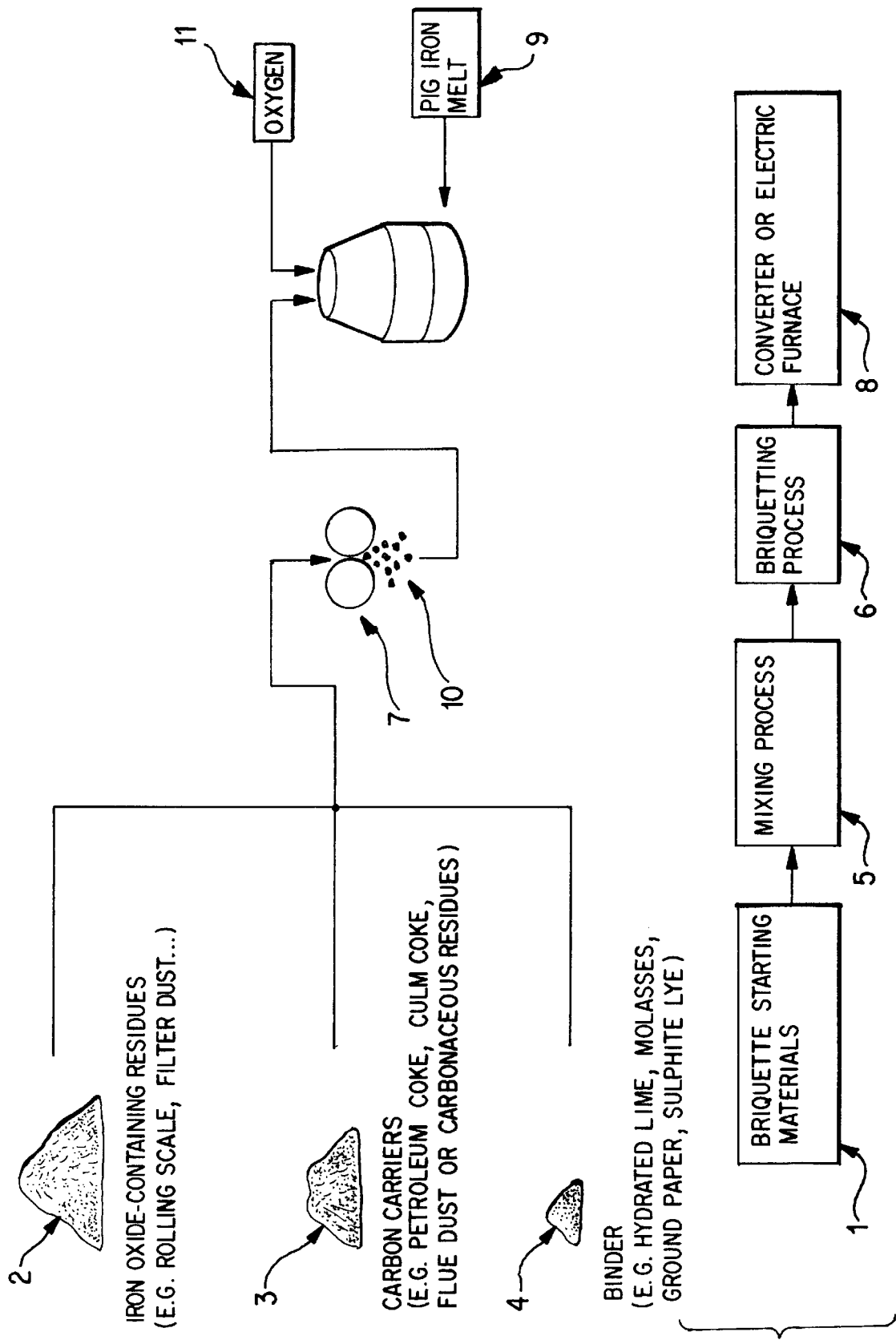

METHOD OF MAKING STEEL

BACKGROUND OF THE INVENTION

The present invention relates to a method of producing briquettes for use in steelmaking processes in a melting vessel, including the step of briquetting iron-oxide containing metallurgical residues.

In smelting plants various iron oxide-containing residues, such as filter dusts from steel plants and blast furnaces, rolling scale from rolling mills and slurries from gas cleaning, are obtained as byproducts. In former times, such residues were disposed of by ultimate disposal on waste disposal sites or they were fed back into the blast-furnace process by application to sintering plants. In view of the increasing demand for a reduction of costs and in view of the limit values for environmental impact which have to be expected in the future, attempts have recently been made to recycle the residues into the steelmaking process. Methods known in this respect are methods in the case of which residues, especially filter dusts orginating from LD plants, are, on the one hand, hot-briquetted and introduced into a converter, or, on the other hand, blown into a converter. These methods are disadvantageous insofar as only a single iron oxide-containing residue can be used. In addition, only a limited amount of iron oxides can be supplied to the converter, and, consequently, said iron oxides exclusively serve as a substitute for cooling ore. It follows that, essentially, iron oxide-containing residue briquettes are supplied only for the purpose of temperature control. The amount of iron oxide-containing residues added rarely exceeds 5% by weight.

It is the object of the present invention to provide a method of producing briquettes which permit a better utilization of iron oxide-containing residues in a steelmaking process in a melting vessel.

BRIEF DESCRIPTION OF THE DRAWING

The DRAWING illustrates a steelmaking process in accordance with the invention in which briquettes including iron oxide-containing metallurgical residues and carbon carriers are added as scrap substitute.

DETAILED DESCRIPTION OF THE INVENTION

In accordance with the present invention, this task is solved by the feature that, prior to the briquetting step, the residues have added thereto essentially uniformly distributed carbon carriers, which are required for achieving an essentially complete, autothermal reduction of the iron oxide-containing residues so that the briquettes can be introduced into the converter as a scrap substitute. Carbon carriers are now located in immediate vicinity to the residues, said carbon carriers being capable of reducing the iron oxides contained in the residues. In addition, the energy balance is essentially optimized and a complete reduction of the iron oxides in the residues is guaranteed. In principle, the step of additionally adding carbon carriers does not seem to make much sense, since, especially in steelmaking processes, a reduction of the carbon content of the melt is normally aimed at. Since, however, the iron oxides contained in the residues can react with the carbon carriers in the residue briquettes, essential advantages are obtained. In the method according to the present invention, a mixture of various metallurgical residues can be used, e.g. filter dusts from steel plants and blast furnaces, rolling scale from rolling mills and dried slurries from wet gas cleaning. The mixing ratio can be chosen in accordance with the respective amount of byproducts obtained. Furthermore, a converter can now deal with large amounts of iron oxide-containing residues so that up to 30% of these residues can be supplied to the converter. Hence, the residues cannot only be used as a substitute for cooling ore, as has been done in the case of the methods known, but they can even be introduced into the converter instead of scrap. This provides essential economic advantages as well as a good possibility of recycling metallurgical residues in steelmaking processes.

U.S. Pat. No. 2,865,731 already discloses the measure of briquetting iron oxide-containing residues while adding cellulose fibres as a binder and introducing the briquettes into a blast furnace for iron production, the binder burning in the blast furnace and supporting the reducing atmosphere therein. However, the briquettes used in this case are not suitable to be used as a scrap substitute in a steelmaking process in a melting vessel, and this is contradictory to the present invention. In addition, this known publication predominantly assesses the advantages of cellulose fibres used as a binder, and this follows a line which is completely different from the solution of the task underlying the present invention, since, under the pressures prevailing in a blast furnace, the dimensional stability of the iron-oxide briquettes is particularly important. The mixing ratio of binder and iron oxides is determined according to the desired stability in the case of the known briquettes.

Furthermore, DE-Auslegeschrift 11 89 573 discloses a method of producing briquettes, e.g. from blast-furnace or converter dust, including the step of admixing, prior to the briquetting process, reducing agents in the form of coal or coke as well as admixtures, after having the starting products previously subjected to progressive comminution with controlled recycling. The briquettes produced in this way are then smelted in the blast furnace. The introduction of material containing a high percentage of oxide in a steelmaking process is not described.

Also, German-Auslegeschrift 11 38 229 and German Patent No. 33 07 175 disclose methods of producing agglomerates consisting of fine ores and reducing agents and used for introduction into a blast furnace.

In accordance with a further variant of the method according to the present invention, the residues and the carbon carriers can be cold-briquetted. It is thus not necessary to briquette the residues immediately after their generation or after renewed heating, whereby substantial amounts of energy can be saved.

Furthermore, protection is claimed for a residue briquette for use in the method according to the present invention. The residue briquette is characterized by a composition of 50–70% iron oxide-containing residues and 15–25% carbon carriers. The exact mixing ratio can then be determined in each individual case in accordance with the composition of the iron oxide-containing residue mixture. It follows that an optimum reduction of the iron oxides in the residues is always guaranteed.

The residues used in the residue briquette are preferably rolling scale and/or filter dusts from steel plants and blast furnaces and/or dried filter slurries from wet gas cleaning. These residues are the residues which are inevitably produced in a smelting plant in the course of other production processes and which must be disposed of. When used in the residue briquette, these residues remain in the metallurgical cycle.

The carbon carriers in the residue briquette can preferably consist of petroleum coke and/or culm coke. These substances already exist in the metallurgical cycle, and, consequently, the residue briquette can easily be produced in a smelting plant.

In accordance with an advantageous embodiment, the residue briquette may contain a binder which is admixed thereto in an essentially uniformly distributed form. This will increase the dimensional stability of the residue briquette, and, consequently, it will not dissolve immediately in the pig iron melt.

The binder can preferably consist of hydrated lime and/or molasses. Hydrated lime is contained in an amount of 1–4% and molasses in an amount of 4–7% based upon the residue briquette. This composition has already proved to be useful as a binder in the field of metallurgical technology.

In addition, the binder may also consist of ground paper, said ground paper being contained in an amount of 1–5% based upon the residue briquette. Also the ground paper proved to be useful as a binder.

Furthermore, protection is claimed for a method of making steel in a melting vessel, said method including the step of supplying to the melting vessel residue briquettes as a scrap substitute.

In the following, one embodiment of the present invention will be explained in detail on the basis of a drawing. The single FIGURE shows a schematic work schedule of the method according to the present invention.

As can be seen from the drawing, the method according to the present invention essentially uses three briquette starting materials 2, which are essentially obtained as byproducts in a smelting plant. The residues 2 used are in particular rolling scale, filter dusts from steel plants and blast furnaces as well as dried slurries from wet gas cleaning.

In addition, carbon carriers 3 are used as briquette starting materials 1; also said carbon carriers are already present in most smelting plants for other production methods, in particular in the form of petroleum coke and culm coke.

A binder 4 is additionally used as the last briquette starting material 1, said binder consisting preferably of hydrated lime and molasses. Another binder which proved to be useful is ground paper.

The briquette starting materials 1, which are preferably present in the form of fine particles, are then combined in a mixing process 5, the percentage of iron oxide-containing residues 2 being approx. 50–70%, the percentage of carbon carriers 3 being approx. 15–25%, and, depending on the type of binder 4 used and the manner in which said binder 4 is used, the percentage of hydrated lime is 1–4%, the percentage of molasses is 4–7% and the percentage of ground paper is 2–4%.

When the briquette starting materials 1 have been mixed in an essentially uniform manner, they are fed to a briquetting press for carrying out the briquetting process 6. The briquetting plants used for the briquetting process 6 are preferably roll-type briquetting machines 7. The briquetting process 6 preferably takes place in the cold condition.

In the meantime or subsequently, pig iron melt 9 is supplied to a converter 8. The pig iron melt 9 has then supplied thereto the previously produced residue briquettes 10 which are filled into the converter 8. Subsequently, the refining process takes place in the converter 8 by blowing in oxygen 11.

Due to the immediate vicinity of the carbon carriers 3 to the iron oxide-containing residues 2, a reduction of the iron oxides will now take place, and this reduction will have the effect that the iron thus produced mixes with the residual pig iron melt. The oxygen of the iron oxide compounds is chemically bonded as carbon monoxide and/or carbon dioxide by the carbon contained in the carbon carriers 3 and discharged from the converter 8. The immediate vicinity of the iron-oxide containing residues to the carbon carriers 3 has the effect that the oxygen 11, which is blown in additionally, primarily serves the purpose of giving off heat due to reaction with the pig iron melt and not only the purpose of oxidizing the carbon carriers 3.

It follows that the method according to the present invention permits a supply of residue briquettes 10 in an amount of up to 30% to the pig iron melt 9 in the converter 8. When an electric furnace 8 is used, the percentages of residue briquettes 10 can be much higher. Hence, residue briquettes 10 can be used instead of scrap. This will especially be the case, if the residue briquettes 10 have admixed thereto an amount of carbon carriers 3 which is just large enough to cause by means of said carbon carriers 3 a complete reduction of the iron oxides in the residue briquettes 10. It follows that the method according to the present invention has the advantage that a large amount of metallurgical residues, provided that the residue briquettes 10 are produced in a smelting plant, can immediately be reused in situ.

The method according to the present invention contributes thus decisively to the solution of environmental problems and raw material shortage.

We claim:

1. A method of making steel in a melting vessel comprising the steps of: cold briquetting a mixture of iron oxide containing metallurgical residues and carbon carriers to form cold-briquetted briquets then supplying said briquets as a scrap substitute to a melting vessel containing a pig iron melt, the carbon carriers being arranged in the briquettes in an essentially uniformly distributed form and the carbon carriers being present in an amount just large enough for causing an essentially complete reduction of the iron-oxide-containing residues of the briquettes in the melting vessel and blowing oxygen into the melting vessel to produce steel.

2. A method according to claim 1, wherein the briquettes include the carbon carriers and iron oxide-residues in a mixing ratio such that essentially all of the carbon of the carbon carriers and oxygen of the iron oxide-containing residues are discharged from the melting vessel as carbon monoxide and/or carbon dioxide.

3. A method according to claim 1, wherein the briquettes include 50–70% iron oxide-containing residues and 15–25% carbon carriers.

4. A method according to claim 3, wherein the residues include rolling scale from rolling mills and continuous casting plants and/or filter dusts from steel plants and blast furnaces and/or dried filter slurries from wet gas cleaning.

5. A method according to claim 3, wherein the residues include petroleum coke and/or culm coke on a basis of hard coal and/or brown coal and/or flue dust.

6. A method according to claim 3, wherein the briquettes include a binder in an essentially uniformly distributed form.

7. A method according to claim 6, wherein the binder comprises hydrated lime and/or sulphite lye and/or molasses, hydrated lime being contained in an amount of 1–4%, molasses in an amount of 2–7%, and sulphite lye in an amount of 1–4% based upon the briquette.

8. A method according to claim 6, wherein the binder comprises ground paper, the ground paper being contained in an amount of 1–4% based upon the briquette.

9. A method according to claim 1, wherein the steel is prepared by melting pig iron, scrap and the briquettes in the melting vessel.

10. A method according to claim 9, wherein the briquettes are added in an amount up to 30% of the pig iron melt.

11. A method according to claim 1, wherein the melting step is carried out in an electric furnace.

* * * * *